Figure 1:
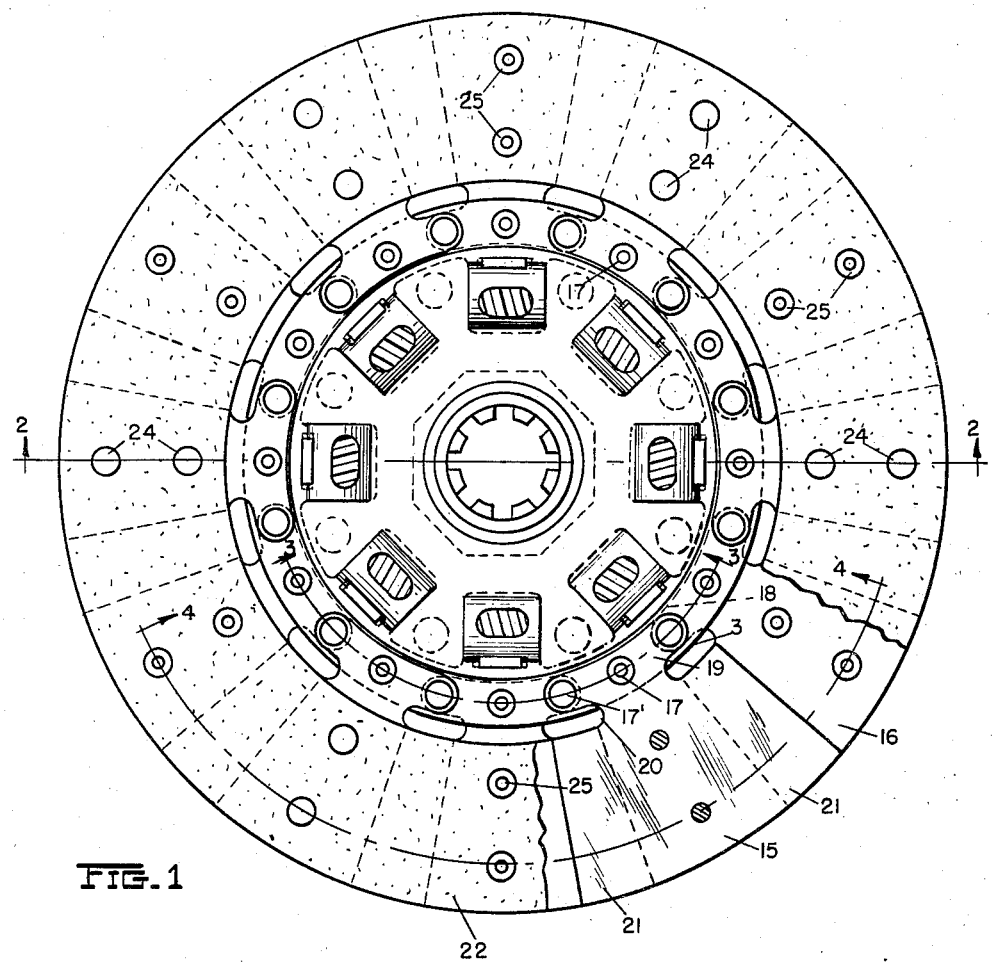

Jan. 18, 1944.  I. SAKS  2,339,430

CLUTCH PLATE

Filed Feb. 8, 1941  2 Sheets-Sheet 1

INVENTOR.
IRA SAKS
BY Oberlin, Limbach & Day
ATTORNEYS

Jan. 18, 1944.  I. SAKS  2,339,430

CLUTCH PLATE

Filed Feb. 8, 1941  2 Sheets-Sheet 2

INVENTOR.
IRA SAKS
BY Oberlin, Limbach & Day
ATTORNEYS

Patented Jan. 18, 1944

2,339,430

UNITED STATES PATENT OFFICE 2,339,430

CLUTCH PLATE

Ira Saks, Cleveland Heights, Ohio

Application February 8, 1941, Serial No. 377,961

8 Claims. (Cl. 192—107)

The present invention relates to a novel form of cushion mounting for the friction facing members of a clutch plate particularly adapted for use in an automotive clutch assembly. More particularly, my invention pertains to an improved construction of separate segmental, flexible elements for supporting the friction facings on the body of the clutch plate. These flexible elements, or separate supporting segments, are adapted to yieldably receive, or "cushion," the engaging pressure of the clutch pressure plate as it forces or packs the clutch plate against the other driving element of the clutch, e. g., the fly-wheel. The axial space within which this flexing action may occur is considerably limited, being not over $\frac{3}{16}$ of an inch at the greatest, in modern automotive clutch assemblies. Accordingly it is one of the objects of my invention to provide a maximum amount of cushioning action in the minimum amount of available space.

Another object of the invention is to provide a separate segment construction wherein a flat supporting or bearing surface for the friction facing rings is provided upon full engagement of the clutch plate, thus eliminating any high or low spots in supporting friction facings when they are subjected to maximum compression and thereby insuring uniform engaging action and maximum life for the friction facings.

Another object of the invention is to provide separate cushion segments in the form of flat, plane surface elements which may be conveniently fabricated, easily maintained within commercial manufacturing tolerance limits and do not require any special crimping, bending or deforming operations.

Another object of the invention is to provide means for fastening or anchoring the separate cushion segments to the disk body, whereby the tendency to rock or loosen the fastening rivets is minimized. This latter object is accomplished by providing common rivets for adjacent segments on opposite sides of the disk whereby the loosening action exerted upon one of the segments in a given direction is counteracted by the action of the other segment in an opposite direction, thus, counterbalancing such actions and aiding in the maintenance of the common fastening rivet in its initially secured position.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various structural forms in which the principle of the invention may be used.

In said annexed drawings—

Figure 2:
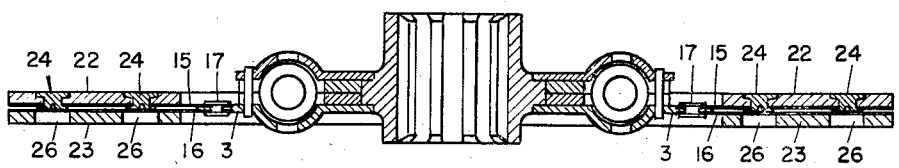
Figure 3:
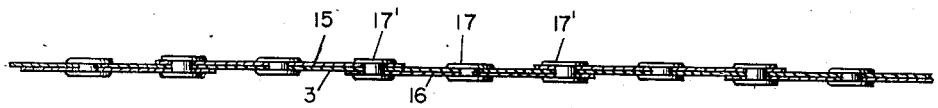
Figure 4:
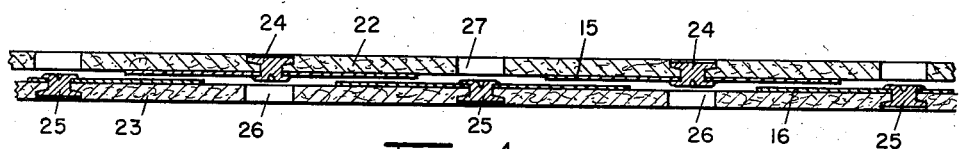
Figure 6:
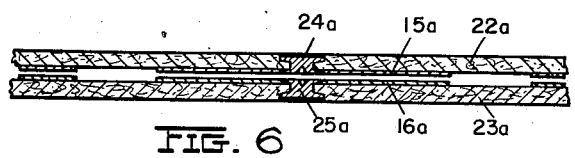
Figure 5:
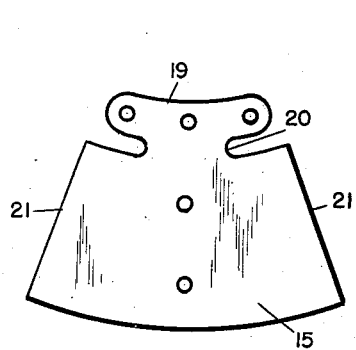
Figure 7:
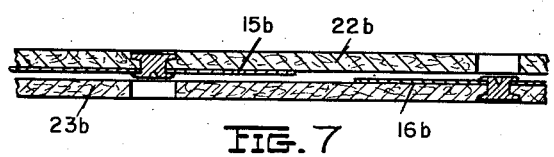
Figure 8:
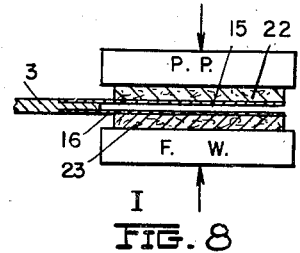
Figure 9:
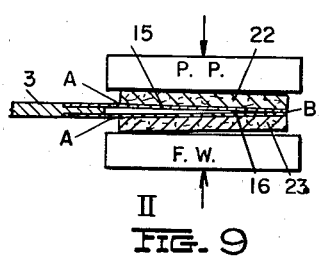

Fig. 1 is a plan view, with portions broken away, of a clutch plate embodying the construction of the invention; Fig. 2 is a mid-sectional view of Fig. 1; Fig. 3 is an enlarged, sectional view, taken along line 3—3 of Fig. 1 and in the direction of the arrows; Fig. 4 is an enlarged, detailed sectional view, taken along line 4—4 of Fig. 1 and in the direction of the arrows; Fig. 5 is a detailed plan view of one of the separate friction facing cushion segments; Fig. 6 is a detailed sectional view similar to Fig. 4, but showing a modified form of arrangement of the separate cushion segments; Fig. 7 is another detailed sectional view similar to Fig. 6 and showing another modified form of arrangement of the separate cushion segments; and Figs. 8, 9 and 10 are radial, sectional views, somewhat diagrammatic and distorted, illustrating the progressive stages of deformation and cushioning action of the separate cushion segments, during engagement of the clutch plate with the driving elements of the clutch.

Separate cushion segments 15 and 16 are attached to opposite sides of the disk 3 by means of the rivets 17 and 17'. Directing attention to Fig. 3, it will be seen that the rivets 17' are common to each of the segments 15 and 16 on opposite sides of the disk 3. In other words, one rivet 17' serves to fasten adjacent segments to the disk and to each other. The rivets 17 are located on the radial, median line of the segments 15 and 16 and fasten only one of them, respectively, to the disk 3.

Referring to Fig. 5, it will be seen that the segments 15 and 16 have an inner tab portion 19 through which the anchoring rivets 17 and 17' pass and which is adapted to fit against the annular shoulder 18 on the outer margin of the disk 3. The segments 15 and 16 have a reduced neck portion 20 and the circumferentially extending wing portions 21. These segments 15 and 16 are normally flat and undeformed and support the friction facing rings 22 and 23, which are secured thereto by means of the fastening rivets 24 and 25. It will be seen that the segments 15 and 16, being flat and disposed upon opposite sides of the disk 3, are normally spaced from each other and parallel to each other, throughout their extent. Upon engagement of the clutch plate with the driving elements of the clutch, such as the pressure plate and fly-wheel, for example, the friction facings 22 and 23 are urged toward each other with a corresponding yieldable deformation or deflection of the segments 15 and 16 which support them. Openings 26 and 27 are provided in the facings 22 and 23, respectively in alignment with the opposite rivets 24 and 25, for receiving the heads of the latter on full, flattening-out collapse of the facings and cushion segments. The cushioning action or stages of deflection of the cushion segments 15 and 16 are illustrated in Figs. 8, 9 and 10. Fig. 8 illustrates the stage of initial, overlying contact of the clutch plate with the pressure plate (marked PP) and the fly-wheel (marked FW). This initial stage of contact is very soft and corresponds to an extreme slipping between the clutch plate and the driving members. As the second stage is entered and as illustrated in Fig. 9, the further compressive movement of the pressure plate and fly-wheel results in a bending or deformation of the segments 15 and 16 at the points A, which correspond with the reduced neck portions 20 thereof. At the same time, the outer marginal portions of the segments 15 and 16 have contacted with each other, limiting further deflection at the latter point. It will be seen that the point of contact of the friction facings 22 and 23 with the pressure plate and fly-wheel has correspondingly moved toward the inner periphery, which has the lowest linear velocity as compared to the outer periphery.

Figure 10:
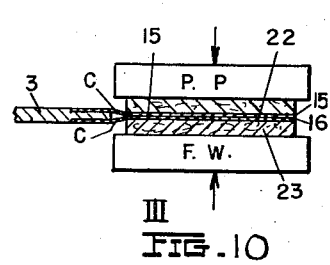

Next, as the clutch plate approaches full engagement, which is shown in Fig. 10, the engaging surface of the friction facings 22 and 23 progressively increases from the inner to the outer margin and simultaneously, the bending or deformation of the segments 15 and 16 into the form as shown at C, becomes increasingly stiff and resistant. In the final state of collapse, or full deflection of the segments 15 and 16, as shown in Fig. 10, the latter have their major portion underlying the facing rings 22 and 23 in flat surface-to-surface contact and are deformed merely in the relatively minor portion between their point of anchorage with the disk 3 and the facing rings 22 and 23 are backed or supported for a major portion of their extent, both circumferentially and radially, with a flat surface. This flat surface support, on full collapse of the cushion segments, produces a firm and substantial reenforcement to the relatively weaker material of the friction facings, when they are subjected to their greatest pressure or strain, thus imparting improved wearing ability of the facings.

In Figs. 6 and 7, modified forms of arrangement of the cushion segments are shown. Thus, in Fig. 6, the cushion segments 15a and 16a, attached to the respective friction facing rings 22a and 23a, are in axial alignment with each other on opposite sides of the disk. The rivets 24a and 25a are of the flush head type permitting the segments 15a and 16a to contact each other throughout their surface on full deflection or collapse. In Fig. 7, the friction facings 22b and 23b, carried by the separate cushion segments 15b and 16b, respectively, on opposite sides of the disk, are circumferentially spaced from each other, rather than partially overlapping, as previously shown in Fig. 4, so that there is a circumferential space between each segment. On full deflection or collapse of the segments 15b and 16b, the latter flatten out against the inner face of the opposed facing, rather than against the other cushion segment.

It will be obvious to those skilled in the art, of course, that the cushioning action or stages of collapse of the cushion segments shown in Figs. 6 and 7, is analogous to that, as previously described in connection with Figs. 11, 12 and 13. Hence, any further, detailed exposition thereof is not here deemed necessary.

It will also be noted in the construction shown in Figs. 1 and 3, particularly, that the common rivets 17', which attach to a portion of each of the adjacent segments 15 and 16 to the disk 3, constitute a construction minimizing the rocking or loosening effect exerted upon these fastening rivets. As the clutch plate rotates and enters into engaging contact with the clutch plate and fly-wheel, for example, there will be a tendency to urge or to pull the segments 15 and 16 away from the disk 3, and in a direction opposite to that of the rotation of the latter, with the result that the segments will have a tendency to rock about their central point of attachment to the disk and to loosen or pull the rivets 17' away from their original fastening positions. However, this pulling or loosening force exerted by the segments 15 on one side of the disk is in an opposite direction to that exerted by the segment 16 on the other side of the disk. In this manner, the loosening action exerted by the respective segments on the common rivets 17', being in opposite directions, results in a counter-balancing or counteracting effect, tending to maintain the common rivets 17' in their original attached position.

It will be noted that the segments 15 and 16 are normally spaced apart from each other a distance equal to the thickness of that portion of the disc body to which they are attached. In the drawings, this distance is equal to the thickness of the disc 3 between the annular shoulders 18. It will be obvious to those skilled in the art that this distance or space between the opposite segments may be increased, as the designing engineer might see fit, by the insertion of shims between the disc body and the segments 15 and 16 or by the elimination of the shoulders 18.

Other modes of applying the principle of my invention may be employed instead of the one explained, change being made as regards the structure herein disclosed, provided the means stated by any of the following claims or the equivalent of such stated means be employed.

I, therefore, particularly point out and distinctly claim as my invention:

1. A clutch plate comprising a disk, friction facing rings having an inner diameter greater than the outer diameter of such disk and separate segments carrying said facing rings and attached at their inner ends to opposite sides of said disk, said segments being axially spaced from, and parallel to each other when said clutch plate is disengaged and circumferentially, alternately disposed on said opposite sides, having portions axially overlapping each other and rivets extending through said disk and through one portion each of circumferentially adjacent segments.

2. A clutch plate comprising a disk, friction facing rings having an inner diameter greater than the outer diameter of such disk and separate segments carrying said facing rings and attached at their inner ends to opposite sides of said disk, said segments being axially spaced from, and parallel to each other thereby presenting an unoccupied space therebetween when said clutch plate is disengaged and circumferentially, alternately disposed on said opposite sides, and having portions axially overlapping each other, said segments being of a normally flat, plane surface form and adapted to be compressed axially into direct contact with each other, to occupy such space, the entire flexible deformation of said segments occurring at those points thereof adjacent such point of attachment to said disk.

3. A clutch plate comprising a disk, friction facing rings having an inner diameter greater than the outer diameter of such disk and separate segments carrying said facing rings and attached at their inner ends to opposite sides of said disk, said segments being axially spaced from, and parallel to each other when said clutch plate is disengaged and circumferentially, alternately disposed on said opposite sides, and having portions axially overlapping each other, and rivets extending through said disk and through one portion each of circumferentially adjacent segments, said segments being of a normally flat, plane surface form and adapted to be compressed axially in a direction towards each other, to occupy such space.

4. A clutch plate comprising a disk, friction facing rings having an inner diameter greater than the outer diameter of such disk and separate segments carrying said facing rings and attached at their inner ends to opposite sides of said disk, said segments being axially spaced from, and parallel to each other thereby presenting an unoccupied space therebetween when said clutch plate is disengaged, said segments on one side of said disk being in axial alignment with those on the other side, said segments being of a normally flat, plane surface form and adapted to be compressed axially into direct contact with each other, to occupy such space, the entire flexible deformation of said segments occurring at those points thereof adjacent such point of attachment to said disk.

5. A clutch plate comprising a disk, friction facing rings having an inner diameter greater than the outer diameter of such disk and separate segments carrying said facing rings and attached at their inner ends to opposite sides of said disk, said segments being axially spaced from, and parallel to each other thereby presenting an unoccupied space therebetween when said clutch plate is disengaged, and circumferentially, alternately disposed on said opposite sides and having alternate, circumferential spaces between each other, said segments being of a normally flat, plane surface form and adapted to be compressed axially into contact with the inside of the opposed facing ring, to occupy such axial space, the entire flexible deformation of said segments occurring at those points thereof adjacent such point of attachment to said disk.

6. A clutch plate comprising a disk, friction facing rings having an inner diameter greater than the outer diameter of such disk and separate normally flat, facing ring support members attached at their radially inner ends to both sides of said disk, said support members being axially spaced from, and parallel to each other thereby presenting an unoccupied space therebetween when said clutch plate is disengaged and adapted to be flexed to a position wherein the opposed, inner sides of the major portion of said support members and of said facing rings occupy such space in a flattened condition directly against each other and the portion of said support members between such point of attachment and such major portion is in a deformed condition when said clutch plate is engaged, such deformation of said support members constituting the sole flexing action of said clutch plate upon movement of said facing rings to engaged position.

7. A clutch plate comprising a disk, friction facing rings having an inner diameter greater than the outer diameter of such disk and separate normally flat segments carrying said facing rings and attached at their inner ends to opposite sides of said disk, said segments being axially spaced from, and parallel to each other thereby presenting an unoccupied space therebetween when said clutch plate is disengaged and circumferentially, alternately disposed on said opposite sides, and having portions axially overlapping each other, said facing rings having a flat inside surface contacting the flat faces of said segments during engaged and disengaged positions of said clutch plate, said segments on opposite sides of said disk being adapted, upon clutch engagement, to be flexed against each other in a flattened condition throughout their portions underlying said facing rings, and in a deformed condition at their portions adjacent such point of attachment to said disk, such last-named deformation of said segments constituting the sole flexing action of said clutch plate upon movement of said facing rings to engaged position.

8. A clutch plate comprising a disk, friction facing rings having an inner diameter greater than the outer diameter of such disk and separate normally flat segments carrying said facing rings and attached at their inner ends to opposite sides of said disk, said segments being axially spaced from, and parallel to each other thereby presenting an unoccupied space therebetween when said clutch plate is disengaged, said segments on one side of said disk being in axial alignment with those on the other side, said facing rings having a flat inside surface contacting the flat faces of said segments during engaged and disengaged positions of said clutch plate, said segments on opposite sides of said disk being adapted, upon clutch engagement, to be flexed against each other in a flattened condition throughout their portions underlying said facing rings, and in a deformed condition at their portions adjacent such point of attachment to said disk, such last-named deformation of said segments constituting the sole flexing action of said clutch plate upon movement of said facing rings to engaged position.

IRA SAKS.